(12) United States Patent
Zhu et al.

(10) Patent No.: US 9,190,056 B2
(45) Date of Patent: Nov. 17, 2015

(54) METHOD AND APPARATUS FOR CORRECTING A WORD IN SPEECH INPUT TEXT

(75) Inventors: Xuan Zhu, Beijing (CN); Hua Zhang, Beijing (CN); Tengrong Su, Beijing (CN); Ki-Wan Eom, Beijing (CN); Jae-Won Lee, Beijing (CN)

(73) Assignee: Samsung Electronics Co., Ltd. (KR)

( * ) Notice: Subject to any disclaimer, the term of this patent is extended or adjusted under 35 U.S.C. 154(b) by 395 days.

(21) Appl. No.: 13/417,725

(22) Filed: Mar. 12, 2012

(65) Prior Publication Data

US 2012/0232904 A1 Sep. 13, 2012

(30) Foreign Application Priority Data

Mar. 10, 2011 (CN) .......................... 2011 1 0063938

(51) Int. Cl.
| | |
|---|---|
| *G10L 15/00* | (2013.01) |
| *G10L 15/08* | (2006.01) |
| *G10L 15/22* | (2006.01) |
| *G10L 15/18* | (2013.01) |

(52) U.S. Cl.
CPC ................. *G10L 15/22* (2013.01); *G10L 15/08* (2013.01); *G10L 15/1815* (2013.01); *G10L 2015/221* (2013.01)

(58) Field of Classification Search
CPC .. G06F 17/278; G06F 17/2765; G06F 17/277
USPC ..................................................... 704/257, 9
See application file for complete search history.

(56) References Cited

U.S. PATENT DOCUMENTS

| | | | | |
|---|---|---|---|---|
| 6,272,464 | B1 * | 8/2001 | Kiraz et al. | 704/257 |
| 6,311,152 | B1 * | 10/2001 | Bai et al. | 704/9 |
| 6,975,766 | B2 * | 12/2005 | Fukushima | 382/229 |
| 7,171,350 | B2 * | 1/2007 | Lin et al. | 704/9 |
| 7,289,956 | B2 * | 10/2007 | Yu et al. | 704/240 |
| 7,742,911 | B2 * | 6/2010 | Chotimongkol et al. | 704/4 |
| 7,865,356 | B2 * | 1/2011 | Weng et al. | 704/9 |
| 7,904,296 | B2 * | 3/2011 | Morris | 704/254 |

(Continued)

FOREIGN PATENT DOCUMENTS

KR 100684160 2/2007

OTHER PUBLICATIONS

Makhoul, John, et al. "Speech and language technologies for audio indexing and retrieval." Proceedings of the IEEE 88.8 (2000): 1338-1353.*

Billa, Jay, et al. "Audio indexing of Arabic broadcast news." Acoustics, Speech, and Signal Processing (ICASSP), 2002 IEEE International Conference on. vol. 1. IEEE, 2002.*

Burger, John D., David Palmer, and Lynette Hirschman. "Named entity scoring for speech input." Proceedings of the 17th international conference on Computational linguistics—vol. 1. Association for Computational Linguistics, 1998.*

(Continued)

*Primary Examiner* — Matthew Baker
(74) *Attorney, Agent, or Firm* — The Farrell Law Firm, P.C.

(57) ABSTRACT

A method and apparatus for correcting a named entity word in a speech input text. The method includes recognizing a speech input signal from a user, obtaining a recognition result including named entity vocabulary mark-up information, determining a named entity word recognized incorrectly in the recognition result according to the named entity vocabulary mark-up information, displaying the named entity word recognized incorrectly, and correcting the named entity word recognized incorrectly.

18 Claims, 9 Drawing Sheets

(56) References Cited

U.S. PATENT DOCUMENTS

| | | | |
|---|---|---|---|
| 8,000,956 B2* | 8/2011 | Brun et al. | 704/9 |
| 8,412,514 B1* | 4/2013 | Feng et al. | 704/9 |
| 8,457,959 B2* | 6/2013 | Kaiser | 704/231 |
| 8,560,298 B2* | 10/2013 | Kumaran et al. | 704/4 |
| 8,583,416 B2* | 11/2013 | Huang et al. | 704/3 |
| 8,583,436 B2* | 11/2013 | Yamamoto et al. | 704/257 |
| 2002/0138265 A1* | 9/2002 | Stevens et al. | 704/251 |
| 2003/0023436 A1* | 1/2003 | Eide | 704/236 |
| 2003/0088411 A1* | 5/2003 | Ma et al. | 704/236 |
| 2003/0191625 A1* | 10/2003 | Gorin et al. | 704/1 |
| 2004/0243407 A1* | 12/2004 | Yu et al. | 704/240 |
| 2006/0015484 A1* | 1/2006 | Weng et al. | 707/3 |
| 2006/0224383 A1 | 10/2006 | Lee et al. | |
| 2006/0253274 A1* | 11/2006 | Miller | 704/9 |
| 2007/0106685 A1* | 5/2007 | Houh et al. | 707/102 |
| 2008/0120091 A1* | 5/2008 | Waibel et al. | 704/2 |
| 2008/0221893 A1* | 9/2008 | Kaiser | 704/257 |
| 2009/0204596 A1* | 8/2009 | Brun et al. | 707/5 |
| 2010/0125457 A1* | 5/2010 | Gilbert et al. | 704/254 |
| 2010/0180199 A1* | 7/2010 | Wu et al. | 715/259 |
| 2011/0173000 A1* | 7/2011 | Yamamoto et al. | 704/240 |
| 2013/0035939 A1* | 2/2013 | Gilbert et al. | 704/254 |

OTHER PUBLICATIONS

Zhou, GuoDong, and Jian Su. "Named entity recognition using an HMM—based chunk tagger." proceedings of the 40th Annual Meeting on Association for Computational Linguistics. Association for Computational Linguistics, 2002.*

Meng, Helen M., et al. "Generating phonetic cognates to handle named entities in English—Chinese cross-language spoken document retrieval." Automatic Speech Recognition and Understanding, 2001. ASRU'01. IEEE Workshop on. IEEE, 2001.*

Yao, Tianfang, Wei Ding, and Gregor Erbach. "Correcting word segmentation and part-of-speech tagging errors for Chinese named entity recognition." The Internet Challenge: Technology and Applications. Springer Netherlands, 2002. 29-36.*

Galibert, Olivier, et al. "Named and Specific Entity Detection in Varied Data: The Quæro Named Entity Baseline Evaluation." LREC. 2010.*

* cited by examiner

METHOD AND APPARATUS FOR CORRECTING A WORD IN SPEECH INPUT TEXT

PRIORITY

This application claims priority under 35 U.S.C. §119(a) to Chinese Patent Application Serial No. 201110063938.4, which was filed in the State Intellectual Property Office of China on Mar. 10, 2011, the entire content of which is incorporated herein by reference.

FIELD OF THE INVENTION

The present invention relates generally to speech recognition technologies, and more particularly, to a method and apparatus for correcting a word in speech input text.

BACKGROUND OF THE INVENTION

When voice recognition is used as an intelligent text input method, i.e., when speech input is converted to text, e.g., in a mobile terminal, an incorrectly recognized word in speech input text is correctable in post-processing. Specifically, speech input by a user is recognized and then the recognition result is examined to detect a word that may be incorrectly recognized. A correction mode is then provided for the user to correct the detected word that may be incorrectly recognized.

Currently, to detect an incorrectly-recognized word, a confidence degree between the input speech and the recognition result is measured through a confidence measure, and when a word with a low confidence degree is detected, that word is identified as possibly being recognized incorrectly. To correct an incorrectly recognized word, a correction mode is provided for a user to re-input the correct word through a number of different methods. For example, the user may choose a correct word from a local communication log, may re-choose a correct word from candidate words with similar pronunciations to the incorrectly-recognized word, may re-input speech through re-speaking, may enter a correct word through handwriting recognition, may directly enter a correct word through keyboard, etc. The word re-input by the user is used for correction.

However, this conventional type of correction mode has a number of defects.

For example, in the conventional correction mode, the same confidence measure is used to analyze every word input by speech recognition. However, word recognition accuracy in recognizing continuous speech in a specific domain can reach 90%, while a word that tends to be incorrectly recognized is an Out-Of-Vocabulary (OOV) word; meaning the word is not included in a speech recognition system vocabulary.

In voice inputting a short message, an email, a query entry, etc., nouns usually carry the main idea of the input content. Among all the nouns, named entity vocabulary, which mainly includes person names, place names, and organization names, has a large proportion. Because the named entity vocabulary is a constantly growing vocabulary set and is continuously updated, many named entity words are OOV words to a speech recognition system, which will tend to cause incorrect recognition. The conventional methods do not focus on locating such named entity vocabulary that often carry the main idea of input content, and tend to be incorrectly recognized.

Further, when correcting an incorrectly recognized word, the conventional methods only focus on providing correction methods for the user by re-inputting a correct word, but do not consider richer or more convenient correction ways.

SUMMARY OF THE INVENTION

Accordingly, the present invention is designed to address at least the problems and/or disadvantages described above and to provide at least the advantages described below.

An aspect of the present invention is to provide a method for correcting a named entity word in a speech input text, which can accurately detect a named entity word recognized incorrectly and can provide richer and more convenient correction options.

Another aspect of the present invention is to provide an apparatus for correcting a named entity word in a speech input text, which can accurately detect a named entity word recognized incorrectly and can provide richer and more convenient correction options.

Another aspect of the present invention is to provide a terminal, which can accurately detect a named entity word recognized incorrectly and can provide richer and more convenient correction options.

In accordance with an aspect of the invention, a method for correcting a named entity word in a speech input text is provided. The method includes recognizing a speech input signal from a user; obtaining a recognition result including named entity vocabulary mark-up information; determining a named entity word recognized incorrectly in the recognition result according to the named entity vocabulary mark-up information; displaying the named entity word recognized incorrectly; and correcting the named entity word recognized incorrectly.

In accordance with an aspect of the invention, an apparatus for correcting a named entity word in a speech input text is provided. The apparatus includes a continuous speech recognizing module; a named entity word detecting module; a user correcting module; and a display. The continuous speech recognizing module recognizes a speech input signal from a user, and outputs a recognition result including named entity vocabulary mark-up information to the named entity word detecting module. The named entity word detecting module determines a named entity word recognized incorrectly in the recognition result according to the named entity word recognized incorrectly in the recognition result, and outputs a marked up recognition result to the user correcting module and the display. The user correcting module corrects the named entity word recognized incorrectly.

In accordance with an aspect of the invention, a terminal for correcting a named entity word in a speech input text is provided. The terminal includes an apparatus for correcting a named entity word in a speech input text; and a display. The apparatus recognizes a speech input signal from a user, obtains a recognition result including named entity vocabulary mark-up information, determines a named entity word recognized incorrectly in the recognition result according to the named entity vocabulary mark-up information, marks up the named entity word recognized incorrectly in the recognition result, outputs a marked up recognition result to the display, corrects the named entity word recognized incorrectly by using a word chosen from at least one of a preset local named entity database and network resources, or by using a word re-inputted by a user. The display displays the marked up recognition result.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
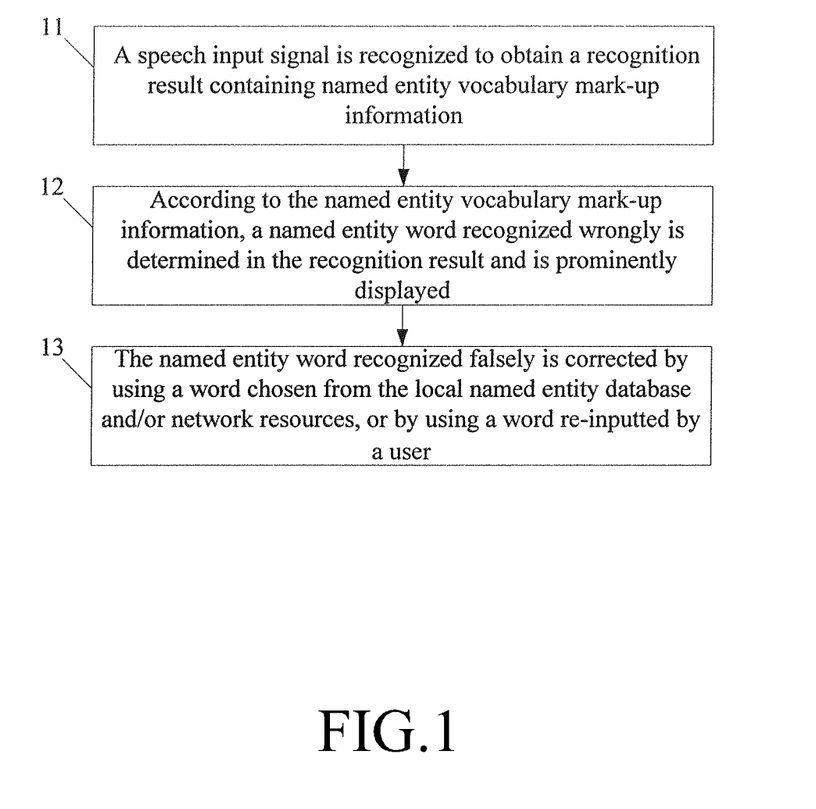
FIG. 1 is a flowchart illustrating a method for correcting a named entity word in a speech input text according to an embodiment of the present invention.

FIG. 1 is a flowchart illustrating a method for correcting a named entity word in a speech input text according to an embodiment of the present invention. In the method illustrated in FIG. 1, it is assumed that a local named entity database is already established.

Referring to FIG. 1, in step 11, a speech input signal is recognized, and a recognition result including named entity vocabulary mark-up information is obtained. In step 12, an incorrectly-recognized named entity word in the recognition result is detected according to the named entity vocabulary mark-up information and is then displayed. In step 13, the incorrect-recognized named entity word is corrected using a word chosen from the local named entity database and/or network resources, or by using a word re-input by a user.

As described above, because the named entity vocabulary mark-up information is included in the recognition result, the subsequent process can focus on locating the named entity word recognized incorrectly, but do not need to detect every word input by the user with respect to whether the word is incorrectly recognized. Further, the method illustrated in FIG. 1 provides a correction mode in which the correction is performed according to the word chosen from the local named entity database and/or network resources, and thus, correction options are richer and more convenient than the conventional techniques in which correction is performed only through multi-modal correction methods for text input.

Figure 2:
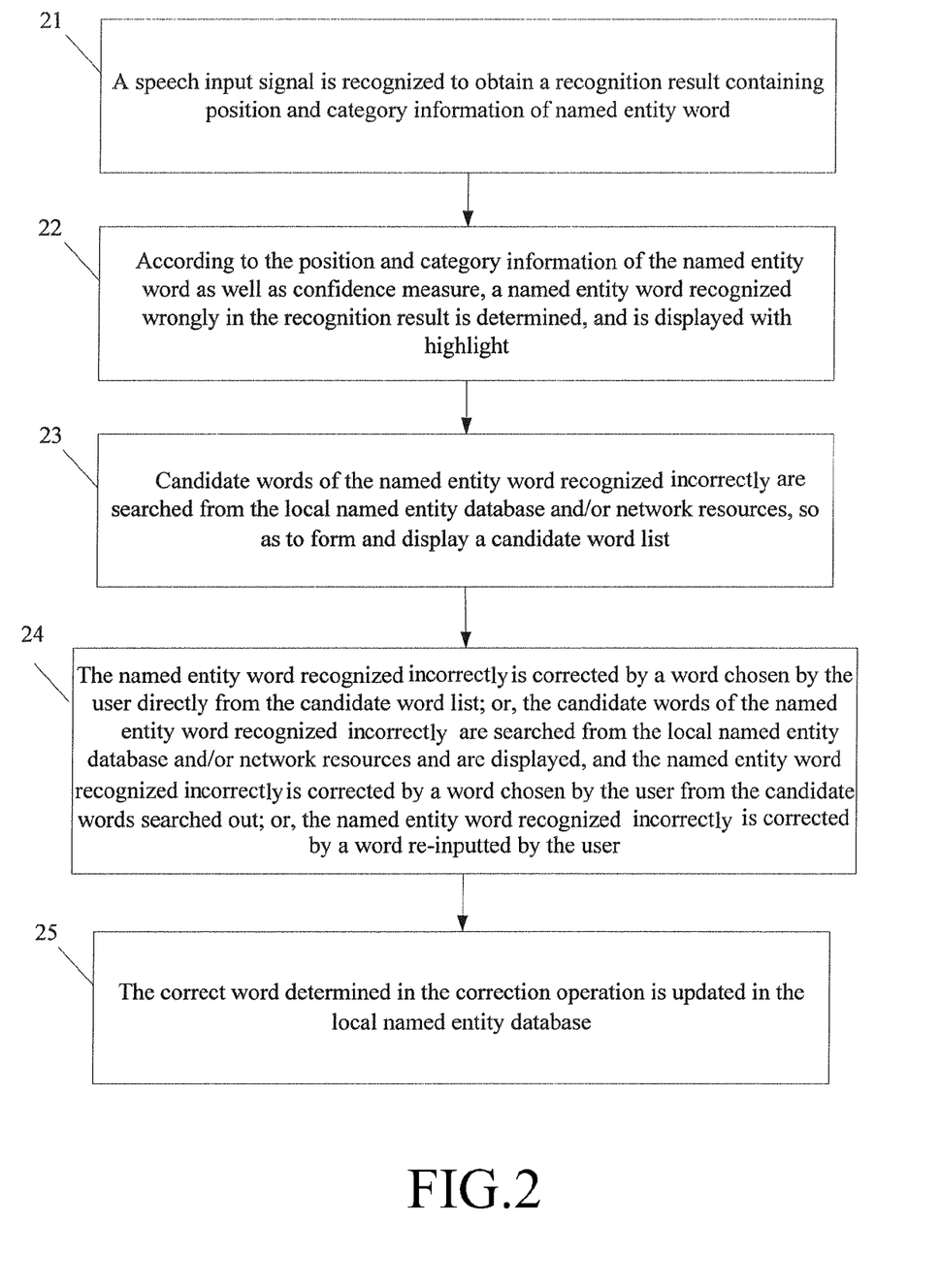
FIG. 2 is a flowchart illustrating a method for correcting a named entity word in a speech input text according to an embodiment of the present invention.

FIG. 2 is a flowchart illustrating a method for correcting a named entity word in a speech input text according to an embodiment of the present invention.

Referring to FIG. 2, in step 21, a speech input signal is recognized, and a recognition result including position and category information of a named entity word is obtained. The position and category information of the named entity word is marked up through a specific implementation mode of the named entity vocabulary mark-up information. The position information refers to the position of the named entity word in a sentence, such as the subject position, the object position, the forepart, or middle-part position in the sentence. The category information refers to a category to which the named entity word belongs, such as the person name category, place name category, or organization name category to which the named entity word belongs.

Figure 3:
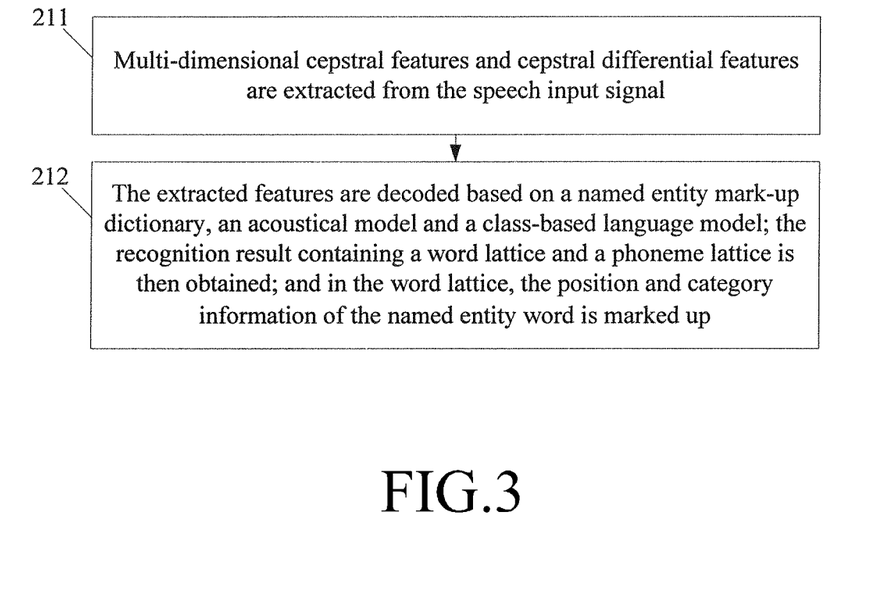
FIG. 3 is a flowchart illustrating a method for obtaining a recognition result from a speech input text according to an embodiment of the present invention.

More specifically, step 21 may be implemented according to the flowchart illustrated in FIG. 3.

Referring to FIG. 3, in step 211, multi-dimensional cepstral features and cepstral differential features are extracted from the speech input signal. The multi-dimensional cepstral features and cepstral differential features in this step are used for representing language-related information in a speech signal. The extraction operation may be implemented by an existing method. For example, an endpoint detection algorithm may be used for segmenting a speech section from a continuous speech stream and then dividing the speech section into frames with 20~30 milliseconds. A Hamming window is applied onto the frame data, and then the frame data is transformed through discrete Fourier transform. A series of bandpass filtering is performed on the spectrum signals, and nonlinear compression is performed on the results of the bandpass filterbank. Finally, discrete cosine transform is performed on a group of data obtained by the nonlinear compression, so that correlations between different components of a feature vector decrease and parts of dimensional components of feature vectors with higher representability are reserved. In order to increase precision and noise robustness of speech recognition, multiple types of cepstral features can be adopted, such as Mel-frequency cepstral coefficient, perceptual linear predictive coefficient and Gamma-tone cepstral coefficient.

In step 212, the extracted features are decoded based on a named entity mark-up dictionary, an acoustical model, and a class-based language model. The recognition result including a word lattice and a phoneme lattice is then obtained. In the word lattice, the position and category information of the named entity word is marked up. Either the word lattice or the phoneme lattice in this step is composed of the lattice of recognition results.

For example, in step 212, the named entity mark-up dictionary can be a Chinese dictionary containing the named entity mark-up information and may be generated in an offline status. Currently, there are multiple algorithms for generating a dictionary, and the dictionary may be generated based on multiple sources, e.g., based on a general dictionary obtained according to the Chinese linguistic rules, or a dictionary obtained by collecting words from a large number of relevant texts, or a new dictionary generated according to distance measure.

After entries in multiple generating sources are combined, valid entries may be chosen therefrom by a method such as a manual check or a statistical measure to form the named entity mark-up dictionary. The named entity mark-up dictionary is a basis of the decoding operation in this step, and also a basis of acoustical model training and class-based language model training.

The acoustical model may be generated in an offline status. Currently, a commonly-used generating method is generating a hidden markov model for a specific application through an algorithm of supervised and unsupervised learning of massive speech data.

The class-based language model may also be generated in an offline status. In the language model training, the named entity words in the same category are regarded as the same vocabulary, for example, the named entity words in the person name category are regarded as the same vocabulary.

The class-based language model has the following two advantages.

First, a common language model will generate an estimation error due to insufficient data. Many named entity words appear in training texts with relatively small frequency. The class-based language model may avoid this problem to some extent, and thus, speech recognition efficiency and recognition robustness can be increased.

Second, considering the named entity vocabulary is a fast and constantly growing vocabulary, the class-based language model can reduce recognition errors caused by OOV words, and thereby increases speech recogintion performance.

There are various existing methods for obtaining the recognition result including the word lattice and the phoneme lattice based on the named entity mark-up dictionary, the acoustical model, and the class-based language model. Accordingly, these existing methods will not be described in detail herein.

In step 212, the position and category information of the named entity word will be marked up in the word lattice according to the named entity mark-up dictionary and the class-based language model.

Referring again to FIG. 2, in step 22, the incorrectly-recognized named entity word in the recognition result is determined according to the position and category information of the named entity word as well as the confidence measure, and is displayed with highlight. More specifically, step 22 may be implemented by the flowchart illustrated in FIG. 4.

Figure 4:
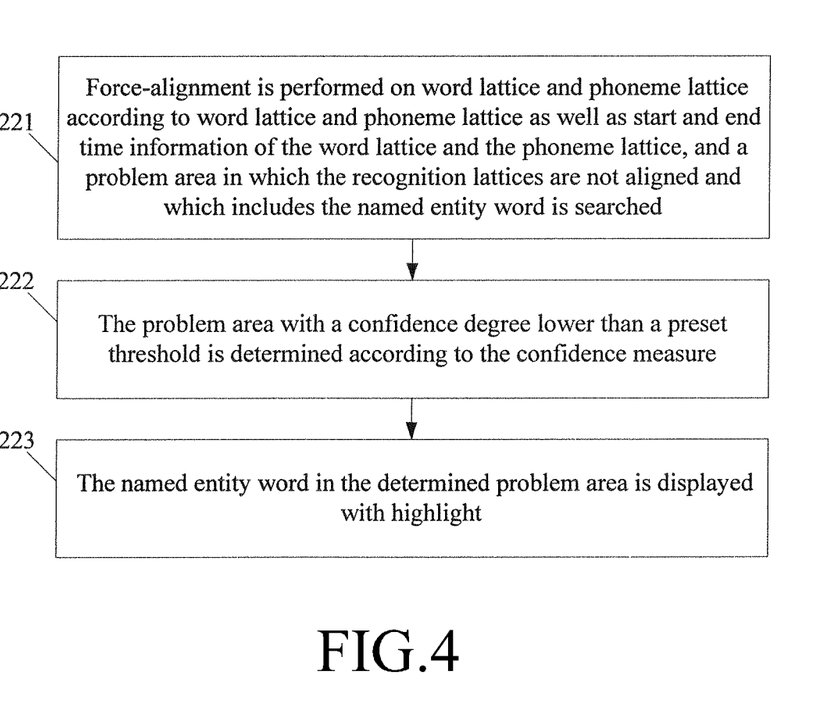
FIG. 4 is a flowchart illustrating a method for detecting a named entity word in a speech input text according to an embodiment of the present invention.

Referring to FIG. 4, in step 221, force-alignment is performed on the word lattice and the phoneme lattice according to the word lattice and the phoneme lattice, as well as the start and end time information of the word lattice and the phoneme lattice, and a problem area in which the recognition lattices are not aligned and which includes the named entity word is searched.

Figure 5:
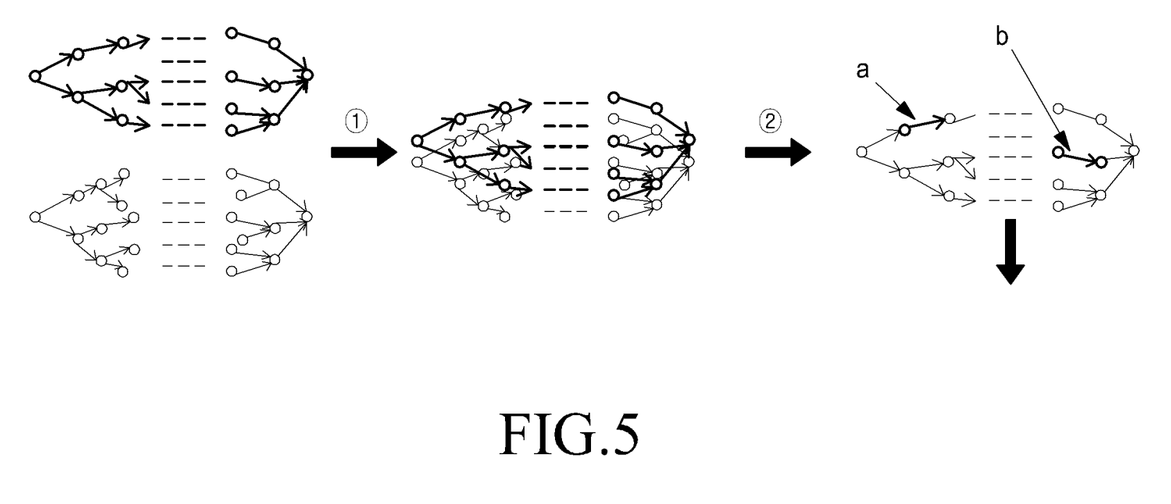
FIG. 5 is a schematic diagram illustrating a procedure of searching for a problem area according to an embodiment of the present invention.

FIG. 5 is a schematic diagram illustrating a procedure of searching for the problem area in step 221, where each circle in the word lattice corresponds to one word, and multiple circles in the phoneme lattice correspond to the pronunciation of one word.

Referring to FIG. 5, arrow ① represents a force alignment procedure with the information of the word lattice and the phoneme lattice as well as the start and end time information. Arrow ② represents searching for the problem area, wherein labels a and b represent detected problem areas.

The force alignment procedure is a conventional algorithm and its specific implementation mode will not be described herein.

Refering again to FIG. 4, in step 222, the problem area with a confidence degree lower than a preset threshold is determined according to the confidence measure. In step 222, a generalized word posterior probability method is adopted, which is a widely-used confidence measure in the conventional techniques. Certainly, other confidence measures may also be adopted. In step 223, the named entity word in the determined problem area is displayed, e.g., with highlight. In step 223, other prominent display modes, such as colored emphasis mark-up, may be adopted.

Referring again to FIG. 2, in step 23, candidate words of the named entity word recognized incorrectly are searched from the local named entity database and/or network resources, to form and display a candidate word list.

For example, a candidate word may be searched out using one of the following two modes.

In the first mode, when the candidate word is searched from the local named entity database, the candidate word in the same category as and with similar pronunciation to the named entity word recognized incorrectly is searched from the local named entity database. When the candidate word is searched from the network resources, the candidate word with similar pronunciation to the named entity word recognized incorrectly is searched out from a public database in the network. Alternatively, the pronunciation of the candidate words is obatined from the local named entity database and the network resources, and then the final candidate word is selected as the search returning rate by using the pronunciation as the query term.

In the second mode, when the candidate word is searched from the local resources, its implementation method is the same as the first mode. When the candidate word is searched from the network resources, it differs from the complete online search of the above first mode in that a half-online or offline search mode is adopted. In the half-online or offline search mode, a server or a server group provided by a service provider in the network is searched for a candidate word with the similar pronunciation to the named entity word recognized incorrectly, and the server or the server group will periodically update its stored named entity words according to the network resources. The half-online or offline search mode has advantages in that because the server side has stored and arranged massive network resources in the offline status and performs periodic updates, it is faster to search for the candidate word from the server side than from the massive network resources directly. This mode is also more cost efficient. In addition, according to the situation of searching for a candidate word in the server or server group, the server side can learn feedback information such as which words have higher search frequency and thereby can use those words as preferred candidate words.

Referring again to FIG. 2, in step 24, the named entity word recognized incorrectly is corrected by a word chosen by the user directly from the candidate word list, or the candidate words of the named entity word recognized incorrectly are searched from the local named entity database and/or network resources and are displayed. The named entity word recognized incorrectly is corrected by a word chosen by the user from the candidate words searched out or is corrected by a word re-input by the user.

In this step, when the user chooses different correction modes, a corresponding correction method is performed.

The user may re-input a word by choosing the word from a local communication log, re-inputting the word through keyboard, or re-speaking the word. Choosing the word from a local communication log and re-inputting the word using a keyboard are similar to the conventional techniques.

Re-speaking the word requires re-recognizing a re-inputted speech input signal and displaying the re-recognition result, and then taking the re-recognition result confirmed by the user as a correct word. When the user re-inputs speech, the step of re-recognizing a re-inputted speech input signal is performed again.

Further, because the size of the display screen at a terminal is limited, the candidate word list formed in step 23 may only list some of the candidate words. Thus, if the user does not find the correct word from the candidate word list and does not want to perform correction through any other of the above correction modes, other candidate words which are searched out in the step 23 but are not included in the candidate word list are displayed to the user, so that the named entity word recognized incorrectly can be corrected by using a word chosen by the user from the other candidate words.

In step 25, the correct word determined in the correction operation is updated in the local named entity database.

The update may include updating the correct word confirmed by the user, the category thereof, the position in a sentence, appearing frequency, and a time of each update.

Based on the update mode for the local named entity database in this step, the above category, the position in the sentence, the appearing frequency, and the time of each update may be considered when step 223 is performed again and when the candidate words are searched from the local named entity database. For example, if the named entity word recognized incorrectly is a person's name, the candidate words in the category of person names are searched directly from the local named entity database. If the named entity word recognized incorrectly is a subject in a sentence, the candidate words which are subjects in a sentence are directly searched from the local named entity database.

As another example, when multiple candidate words are searched out for the named entity word recognized incorrectly, a candidate word appearing most frequently is arranged in the front, or a candidate word which is always updated more quickly is arranged in the front. Similarly, when the candidate words are searched from the network resources in step 23, the words may be arranged according to the number of times that the words are searched out, and the word with the larger number of search times is arranged in the front.

According to an embodiment of the invention, the local named entity database is updated according to a correct word determined by the user. Because the updated correct word is frequently used by the user, it is easier to find the candidate word that is closer to the named entity word recognized incorrectly from the local named entity database.

Figure 6:
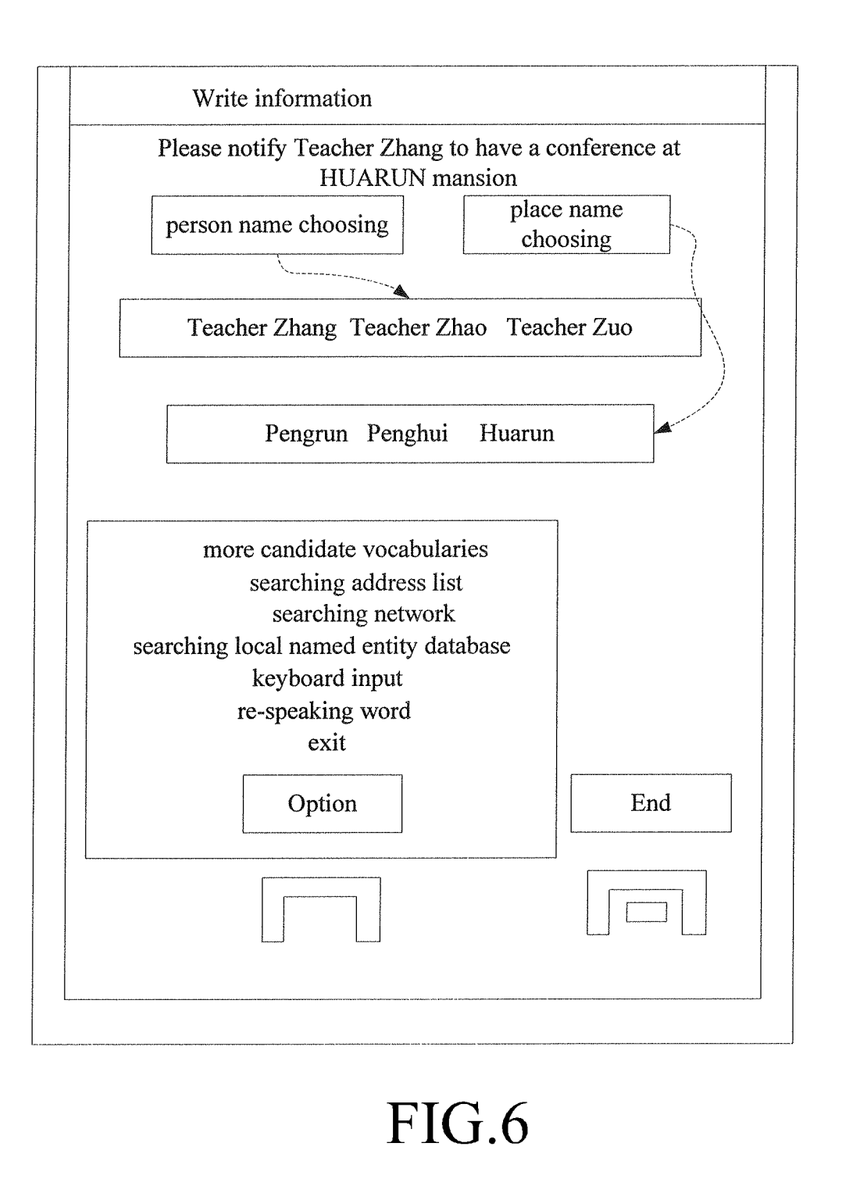
FIG. 6 illustrates an example of a user interface according to an embodiment of the present invention.

FIG. 6 is a schematic diagram illustrating a user interface according to an embodiment of the present invention.

Referring to FIG. 6, a user speaks "Please notify Teacher Zhang to have a conference at HUARUN mansion", wherein "Teacher Zhang" and "HUARUN" are two named entity words recognized incorrectly and, e.g., are displayed with highlight (not shown). With respect to the word "Teacher Zhang" recognized incorrectly, a provided candidate word list for person name choosing includes "Teacher Zhang, Teacher Zhao, and Teacher Zuo". With respect to the word "HUARUN" recognized incorrectly, a provided candidate word list for place name choosing includes "Pengrun, Penghui, and Huarun".

Besides choosing a word from the candidate word list directly, the user may choose other correction modes provided in "options", such as, "more candidate words", "searching an address list", "searching the network", "searching the local named entity database", "keyboard input", or "re-speaking the word". When the user clicks on "searching the network" or "searching the local named entity database", according to step 24 in FIG. 2, the candidate words searched out are displayed and the two named entity words recognized incorrectly are corrected by using the words chosen by the user from the candidate words.

Figure 7:
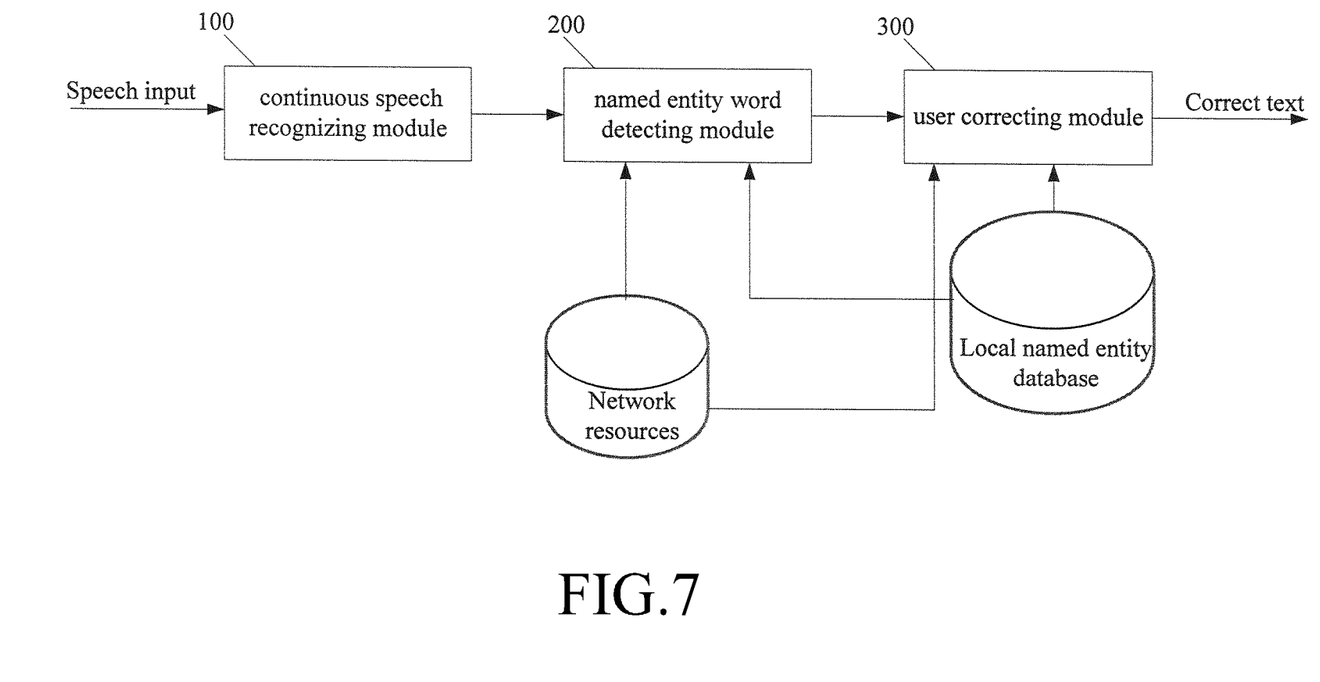
FIG. 7 is a schematic diagram illustrating an apparatus for correcting a named entity word in a speech input text according to the present invention.

FIG. 7 is a schematic diagram illustrating an apparatus for correcting a named entity word in a speech input text according to an embodiment of the present invention.

Referring to FIG. 7, the apparatus includes a continuous speech recognizing module 100, a named entity word detecting module 200, and a user correcting module 300. Although these modules are illustrated as separate components in FIG. 7, these components may be embodied as a single component performing the different operations, such as a microprocessor.

The continuous speech recognizing module 100 recognizes a speech input signal, and outputs a recognition result including named entity vocabulary mark-up information to the named entity word detecting module 200.

The named entity word detecting module 200 determines a named entity word recognized incorrectly in the recognition result according to the named entity vocabulary mark-up information, marks up the named entity word recognized incorrectly in the recognition result, and outputs the recognition result to the user correcting module 300 and a display (not shown).

The user correcting module 300 corrects the named entity word recognized incorrectly by uing a word chosen from a local named entity database and/or network resources, or by using a word re-inputted by the user.

Figure 8:
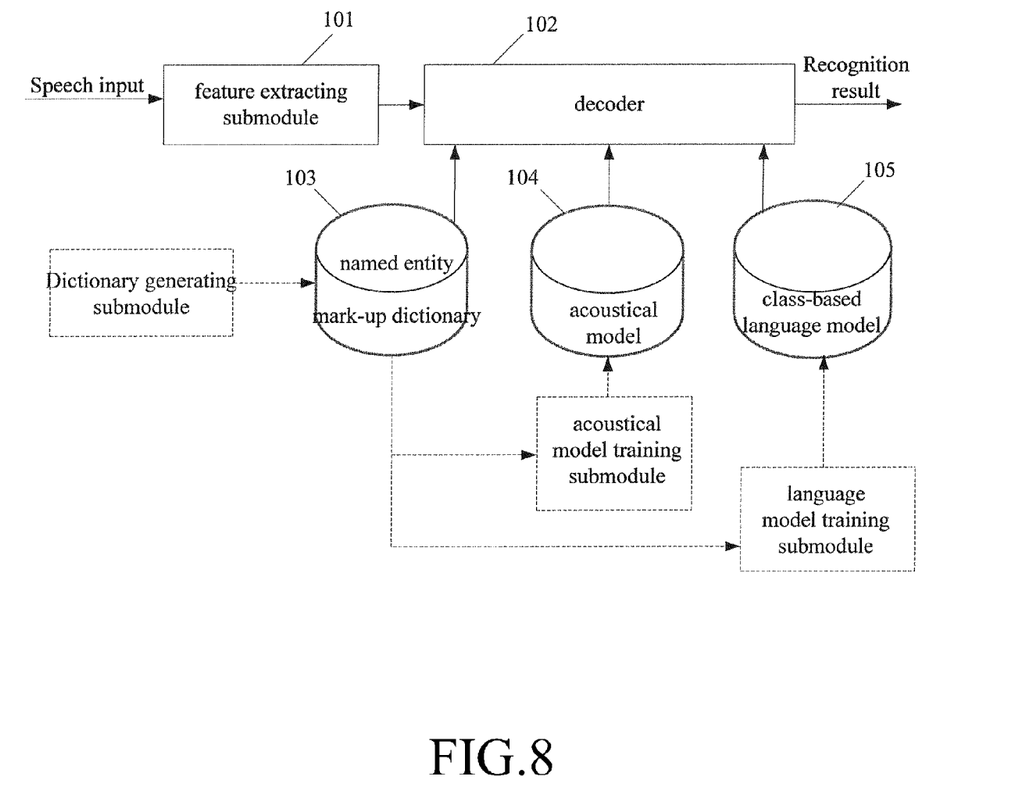
FIG. 8 is a schematic diagram illustrating a continuous speech recognizing module according to an embodiment of the present invention.

FIG. 8 is a schematic diagram illustrating a continuous speech recognizing module according to an embodiment of the present invention.

Referring to FIG. 8, the continuous speech recognizing module includes a feature extracting submodule 101, a decoder 102, a named entity mark-up dictionary 103, an acoustical model 104, and a class-based language model 105.

The feature extracting submodule 101 extracts multi-dimensional cepstral features and cepstral differential features from the speech input signal, and outputs the extracted features to the decoder 102.

The named entity mark-up dictionary 103 is an input of the decoder 102, e.g., a Chinese dictionary including the named entity mark-up information, and may be generated in an offline status. The named entity mark-up dictionary 103 may be generated by a dictionary generating submodule illustrtaed in FIG. 8.

The acoustical model 104 is another input of the decoder 102 and may be generated in the offline status. The acoustical model 104 may be an acoustical model training submodule illustrated in FIG. 8.

The class-based language model 105 is the third input of the decoder 102 and may be generated in the offline status. The class-based language model 105 may be generated by a language model training submodule illustrated in FIG. 8.

The decoder 102 obtains a two-level recognition result including a word lattice and a phoneme lattice based on the named entity mark-up dictionary 103, the acoustical model 104, and the class-based language model 105. In the word lattice, the name entity vocabulary mark-up information is marked up. The word lattice and the phoneme lattice are output to the named entity word detecting module 200. Herein, the name entity vocabulary mark-up information is position and category information of the named entity vocabulary.

Figure 9:
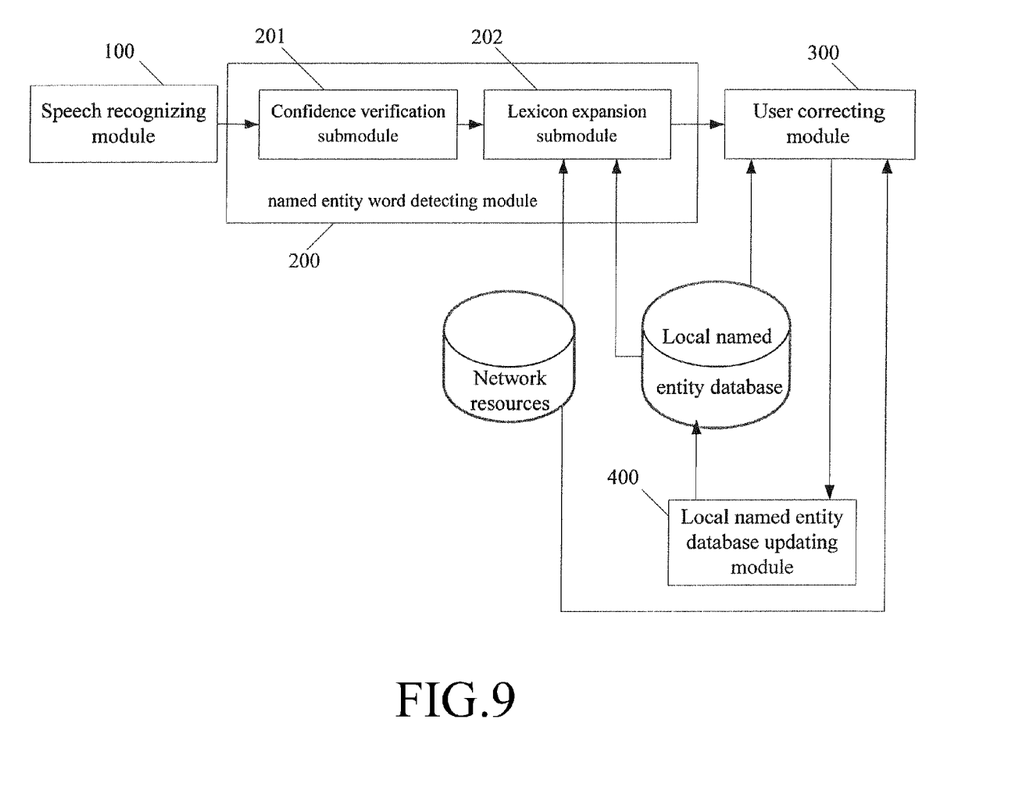
FIG. 9 is a schematic diagram illustrating a named entity detection module according to an embodiment of the present invention.

FIG. 9 is a schematic diagram illustrating a named entity word detecting module according to an embodiment of the present invention.

Referring to FIG. 9, the named entity word detecting module 200 includes a confidence checking submodule 201 and a lexicon expansion submodule 202.

The confidence checking submodule 201 performs force alignment on the word lattice and the phoneme lattice according to the word lattice and the phoneme lattice, which are outputted by the decoder 102, as well as the start and end time information thereof, determines a problem area in which recognition lattices are not aligned and which includes the named entity vocabulary mark-up information and which has a confidence degree lower than a preset threshold, marks up a named entity word in the determined problem area in the recognition result, and outputs the recognition result which is marked up to the lexicon expansion submodule 202.

The lexicon expansion submodule 202 searches the local named entity database and the network resources for candidate words of the named entity word in the determined problem area, forms and outputs a candidate word list to the display component, and outputs the recognition result that is marked up to the user correcting module 300 and the display.

As described above, according to an embodiment of the present invention, the named entity vocabulary mark-up information includes position and property information of the named entity vocabulary.

Further, as illustrated in FIG. 9, the apparatus also includes a local named entity database updating module 400 that updates the correct word determined by the user correcting module after correction, the category thereof, the position in a sentence, appearing frequency and time of each update in the local named entity database.

Further, when the candidate words of the determined named entity word are searched from the local named entity database, the lexicon expansion submodule 202 also determines a sequence for arranging the candidate words according to the above category, the position in the sentence, the appearing frequency and the time of each update.

Figure 10:
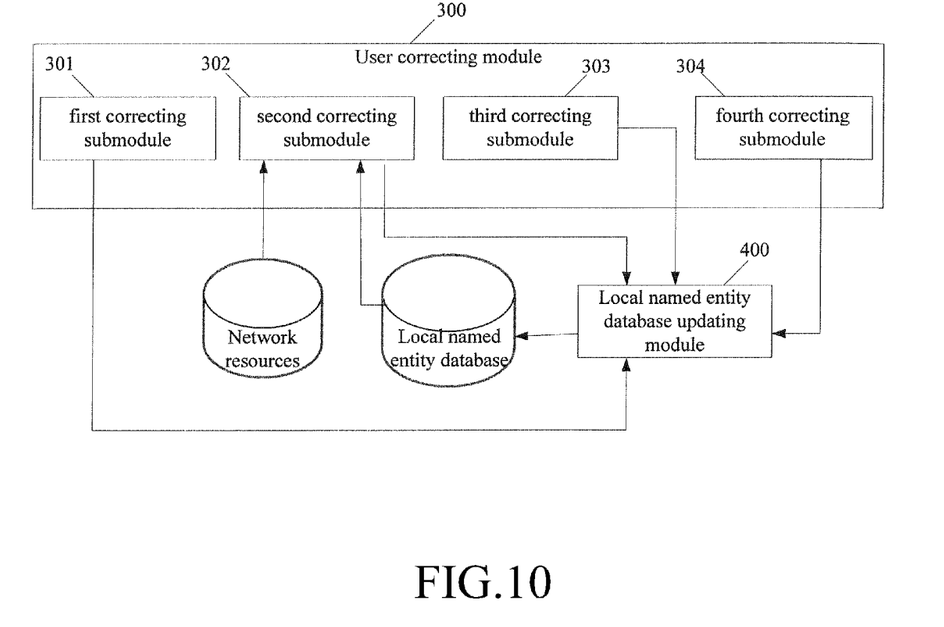
FIG. 10 is a schematic diagram illustrating a user correcting module according to an embodiment of the present invention.

FIG. 10 is a schematic diagram illustrating a user correcting module according to an embodiment of the present invention.

Referring to FIG. 10, the user correcting module 300 includes a first correcting submodule 301, a second correcting submodule 302, and a third correcting submodule 303. Although these submodules are illustrated as separate components in FIG. 7, these components may be embodied as a single component performing the different operations, such as a microprocessor.

The first correcting submodule 301 corrects, after triggered by a user, the named entity word recognized incorrectly, using a word chosen by the user directly from the candidate word list. The first correcting submodule 301 outputs the correct word to the local named entity database updating module 400. The first correcting submodule 301 provides a correction mode for choosing a correct word directly from the candidate word list, and performs subsequent operations after the user chooses this correction mode.

The second correcting submodule 302 searches the local named entity database and/or network resources for the candidate words of the named entity word in the determined problem area after being triggered by the user, and outputs the candidate words to the display component. The second correcting submodule 302 corrects the named entity word recognized incorrectly by using a word chosen by the user directly from the candidate words, and outputs the correct word determined through correction to the local named entity database updating module 400. The second correcting submodule 302 provides a correction mode for choosing a correct word directly from the candidate words, and performs subsequent operations after the user chooses this correction mode.

The third correcting submodule 303 corrects, after being triggered by the user, the named entity word recognized incorrectly by using a word re-inputted by the user, and outputs the correct word determined through correction to the local named entity database updating module 400. Herein, the third correcting submodule 303 provides a correction mode for re-inputting a word by the user, and performs subsequent operations after the user chooses this correction mode. When the user re-inputs the word through re-speaking, the third correcting submodule 303 triggers the continuous speech recognizing module to re-recognize a speech input signal which is re-inputted, displays a re-recognition result, and takes the re-recognition result confirmed by the user as a confirmed correct word.

When the user does not choose the correct word from the candidate word list and does not want to perform correction through any other modes mentioned above, the user correcting module 300 may further include a fourth correcting submodule 304 that displays, after being triggered by the user, more candidate words that are determined by the lexicon expansion submodule 202, but that are not included in the candidate word list. The fourth correcting submodule 304 corrects the named entity word recognized incorrectly by using a word chosen by the user from the more candidate words, and outputs the correct word determined through correction to the local named entity database updating module 400. The fourth correcting submodule 304 provides a correction mode which has more candidate words, and performs subsequent operations after the user chooses this correction mode.

Figure 11:
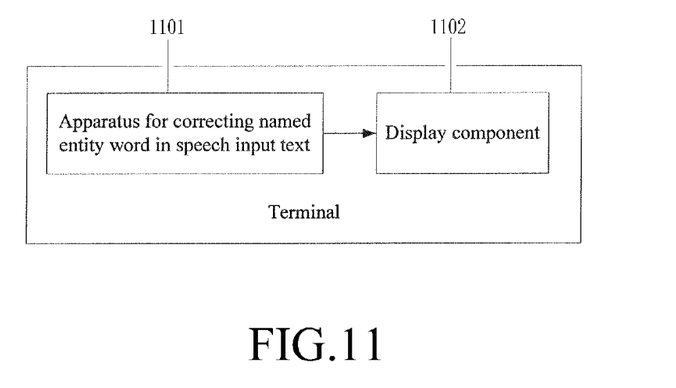
FIG. 11 is a schematic diagram illustrating a terminal according to an embodiment of the present invention.

FIG. 11 is a schematic diagram illustrating a terminal according to an embodiment of the present invention.

Referring to FIG. 11, the terminal includes an apparatus for correcting a named entity word in a speech input text 1101, and a display 1102.

The apparatus for correcting a named entity word in a speech input text 1101 recognizes a speech input signal and obtains a recognition result including named entity vocabulary mark-up information. According to the named entity vocabulary mark-up information, the apparatus 1101 determines a named entity word recognized incorrectly in the recognition result, marks up the named entity word recognized incorrectly in the recognition result, and outputs the recognition result which is marked up to the display component. The apparatus 1101 corrects the named entity word recognized incorrectly by using a word chosen from a preset local named entity database and/or network resources, or by using a word re-input by a user.

The display 1102 displays the recognition result, which is marked up and is output by the apparatus 1101. For example, the display 1102 may be an Liquid Crystal Display (LCD) or a touch screen display.

The internal structure and additional functions of the apparatus 1101 in the terminal are the same as the apparatus described in FIGS. 7-10, and will not be described again herein.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for correcting a named entity word in a speech input text, the method comprising:
   recognizing, via at least one processor, a speech input signal from a user;
   obtaining a recognition result including named entity vocabulary mark-up information;
   determining a named entity word recognized incorrectly in the recognition result based on position and category information of the named entity word through implementation of a mode of the named entity vocabulary mark-up information;
   displaying the named entity word recognized incorrectly; and
   correcting the named entity word recognized incorrectly,
   wherein obtaining the recognition result comprises:
      obtaining the recognition result including a word lattice and a phoneme lattice based on a named entity mark-up dictionary, an acoustical model, and a class-based language model; and
      marking up the named entity vocabulary mark-up information in the word lattice, wherein the word lattice and the phoneme lattice include recognition lattices, and
   wherein determining the named entity word recognized incorrectly in the recognition result according to the named entity vocabulary mark-up information comprises:
      performing force alignment on the word lattice and the phoneme lattice with information of the word lattice and the phoneme lattice and start and end time information;
      searching for a problem area in which the recognition lattices are not aligned and which includes the named entity vocabulary;
      determining a problem area with a confidence degree lower than a preset threshold; and
      marking up the named entity word in the determined problem area.

2. The method of claim 1, wherein the named entity word recognized is corrected by using a word chosen from at least one of a preset local named entity database and network resources, or by using a word re-input by the user.

3. The method of claim 2, wherein obtaining the recognition result further comprises:
   extracting multi-dimensional cepstral features and cepstral differential features from the speech input signal.

4. The method of claim 2, wherein correcting the named entity word recognized incorrectly comprises:
   searching for candidate words of the named entity word recognized incorrectly from at least one of the local named entity database and the network resources;
   forming and displaying a candidate word list; and
   correcting the named entity word recognized incorrectly by using the word chosen by the user directly from the candidate word list.

5. The method of claim 4, wherein searching for the candidate words of the named entity word recognized incorrectly from at least one of the local named entity database and the network resources comprises:
   when searching in the local named entity database, searching for a word which is in a same category as and with similar pronunciation to the named entity word recognized incorrectly from the local named entity database;
   when searching in the network resources, searching one of a public database, a predetermined server, or a server group in a network for a word with similar pronunciation to the named entity word recognized incorrectly; and
   when searching in the local named entity database and in the network resources, obtaining pronunciation of the candidate words from the local named entity database and the network resources, and selecting a final candidate word as a search returning rate by using the pronunciation as a query term.

6. The method of claim 5, wherein correcting the named entity word recognized incorrectly further comprises:
   updating a correct word determined after the correcting, a category of the correct word, a position of the correct word in a sentence, appearing frequency of the correct word, and time of each update in the local named entity database, and when searching in the local named entity database, further determining a sequence for arranging the candidate words according to the category of the correct word, the position of the correct word in the sentence, the appearing frequency of the correct word, and the time of each update.

7. The method of claim 4, further comprising:
   displaying more candidate words that searched out but that are not included in the candidate word list; and
   correcting the named entity word recognized incorrectly by using a word chosen by the user from the more candidate words.

8. The method of claim 2, wherein correcting the named entity word recognized incorrectly comprises:
   searching for and displaying candidate words of the named entity word recognized incorrectly from the local named entity database or the network resources; and
   correcting the named entity word recognized incorrectly by using a word chosen by the user directly from the candidate words.

9. The method of claim 8, wherein searching for the candidate words of the named entity word recognized incorrectly from at least one of the local named entity database and the network resources comprises:
   when searching in the local named entity database, searching for a word which is in a same category as and with similar pronunciation to the named entity word recognized incorrectly from the local named entity database;
   when searching in the network resources, searching one of a public database, a predetermined server, or a server group in a network for a word with similar pronunciation to the named entity word recognized incorrectly; and
   when searching in the local named entity database and in the network resources, obtaining pronunciation of the candidate words from the local named entity database and the network resources, and selecting a final candidate word as a search returning rate by using the pronunciation as a query term.

10. The method of claim 9, wherein correcting the named entity word recognized incorrectly further comprises:
    updating a correct word determined after the correcting, a category of the correct word, a position of the correct word in a sentence, appearing frequency of the correct word, and time of each update in the local named entity database, and when searching in the local named entity database, further determining a sequence for arranging the candidate words according to the category of the correct word, the position of the correct word in the sentence, the appearing frequency of the correct word, and the time of each update.

11. The method of claim 2, wherein correcting the named entity word recognized incorrectly comprises correcting the named entity word recognized incorrectly by using a word re-input by the user.

12. The method of claim 11, wherein when the word re-input by the user is re-input by the user by speech, the method further comprises:
- re-recognizing a speech input signal; displaying a re-recognition result; and
- selecting the re-recognition result as a correct word after the user confirms the re-recognition result.

13. An apparatus for correcting a named entity word in a speech input text, the apparatus comprising:
- a continuous speech recognizing module;
- a named entity word detecting module;
- a user correcting module; and
- a display, wherein the continuous speech recognizing module recognizes a speech input signal from a user, and outputs a recognition result including named entity vocabulary mark-up information to the named entity word detecting module, wherein the named entity word detecting module determines a named entity word recognized incorrectly in the recognition result based on position and category information of the named entity word through implementation of a mode of the named entity word recognized incorrectly in the recognition result, and outputs a marked up recognition result to the user correcting module and the display, and wherein the user correcting module corrects the named entity word recognized incorrectly,
- wherein the continuous speech recognizing module comprises:
  - a decoder;
  - a named entity mark-up dictionary;
  - an acoustical model; and
  - a class-based language model,
  - wherein the decoder obtains a two-level recognition result including a word lattice and a phoneme lattice according to the named entity mark-up dictionary, the acoustical model, and the class-based language model, and outputs the two-level recognition result to the named entity word detecting module, wherein the word lattice and the phoneme lattice include recognition lattices, and the word lattice includes the named entity vocabulary mark-up information, and
- wherein the named entity word detecting module comprises:
  - a confidence verification submodule; and
  - a lexicon expansion submodule, wherein the confidence verification submodule performs force alignment on the word lattice and the phoneme lattice with information of the word lattice and the phoneme lattice, and start and end time information, determines a problem area in which recognition lattices are not aligned and which includes the named entity vocabulary mark-up information and has a confidence degree lower than a preset threshold, marks up a named entity word in the problem area, and outputs the marked up recognition result to the lexicon expansion submodule, and wherein the lexicon expansion submodule searches the local named entity database and the network resources for candidate words of the named entity word in the problem area, forms and outputs a candidate word list to the display component, and outputs the marked up recognition result to the user correcting module and the display.

14. The apparatus of claim 13, wherein the user correcting module corrects the named entity word recognized incorrectly by using a word chosen from at least one of a local named entity database and network resources, or by using a word re-input by the user.

15. The apparatus of claim 14, wherein the continuous speech recognizing module further comprises:
- a feature extracting submodule,
- wherein the feature extracting submodule extracts multi-dimensional cepstral features and cepstral differential features from the speech input signal, and outputs the extracted features to the decoder.

16. The apparatus of claim 15, further comprising:
- a local named entity database updating module that updates a correct word determined by the user correcting module through correction, a category of the correct word, a position of the correct word in a sentence, appearing frequency of the correct word, and time of each update in the local named entity database, wherein the lexicon expansion submodule determines, when searching for the candidate words of the named entity database in the local named entity database, a sequence for arranging the candidate words according to the category, the position in the sentence, the appearing frequency, and the time of each update.

17. The apparatus of claim 16, wherein the user correcting module comprises:
- a first correcting submodule;
- a second correcting submodule; and
- a third correcting submodule, wherein the first correcting submodule corrects, after being triggered by a user, the named entity word recognized incorrectly, using a word chosen by the user directly from the candidate word list, and outputs the correct word determined through correction to the local named entity database updating module, wherein the second correcting submodule searches at least one of the local named entity database and network resources for the candidate words of the named entity word in the determined problem area, outputs the candidate words to the display component, corrects the named entity word recognized incorrectly by using a word chosen by the user directly from the candidate words searched out, and outputs the correct word determined through correction to the local named entity database updating module, and wherein the third correcting submodule corrects the named entity word recognized incorrectly by using a word re-input by the user, and outputs the correct word determined through correction to the local named entity database updating module.

18. A terminal, comprising:
- an apparatus for correcting a named entity word in a speech input text; and
- a display, wherein the apparatus recognizes a speech input signal from a user, obtains a recognition result including named entity vocabulary mark-up information, determines a named entity word recognized incorrectly in the recognition result based on position and category information of the named entity word through implementation of a mode of the named entity vocabulary mark-up information, marks up the named entity word recognized incorrectly in the recognition result, outputs a marked up recognition result to the display, corrects the named entity word recognized incorrectly by using a word chosen from at least one of a preset local named entity database and network resources, or by using a word re-inputted by a user, and wherein the display displays the marked up recognition result, wherein the apparatus is further configured for:
obtaining the recognition result including a word lattice and a phoneme lattice based on a named entity mark-up dictionary, an acoustical model, and a class-based language model;
marking up the named entity vocabulary mark-up information in the word lattice, wherein the word lattice and the phoneme lattice include recognition lattices:
performing force alignment on the word lattice and the phoneme lattice with information of the word lattice and the phoneme lattice and start and end time information;
searching for a problem area in which the recognition lattices are not aligned and which includes the named entity vocabulary;
determining a problem area with a confidence degree lower than a preset threshold; and
marking up the named entity word in the determined problem area.

* * * * *